Oct. 15, 1963
S. F. MILLER ET AL
3,106,805
LEAD CONTROL STRUCTURE
Filed May 29, 1961
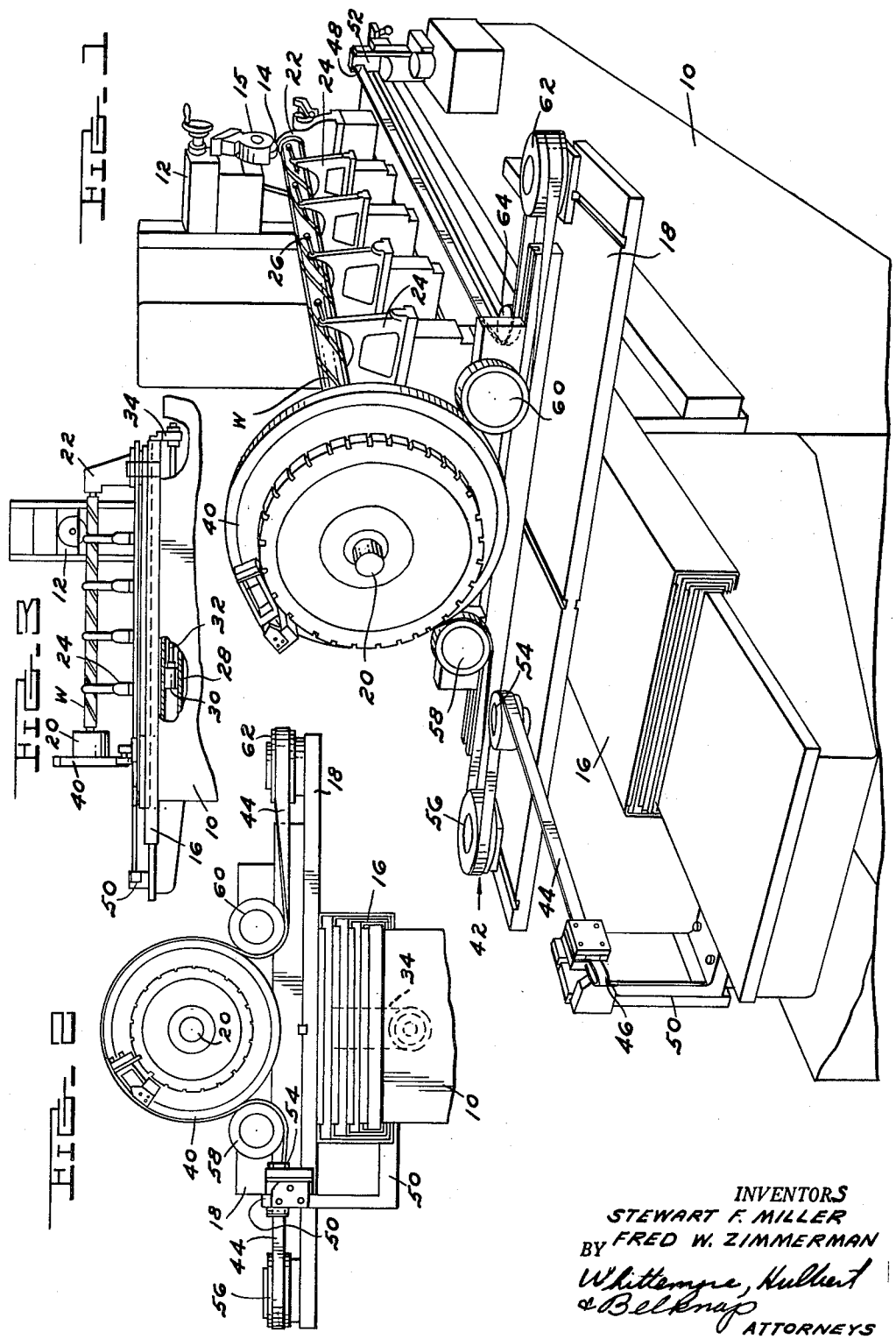
INVENTORS
STEWART F. MILLER
BY FRED W. ZIMMERMAN
Whittemore, Hulbert
& Belknap
ATTORNEYS 3,106,805
LEAD CONTROL STRUCTURE
Stewart F. Miller, Roseville, and Fred W. Zimmerman, New Baltimore, Mich., assignors to National Broach & Machine Company, Detroit, Mich., a corporation of Michigan
Filed May 29, 1961, Ser. No. 113,452
3 Claims. (Cl. 51—95)

This invention relates to a lead control structure. More particularly, this invention relates to a machine tool for grinding leads on a rotary workpiece or lead bar in such a manner that the lead is accurately controlled.

This invention is particularly adaptable to machine the lead on lead bars of substantial length and in practice has been found to hold the lead accurately to within half a ten thousandth of an inch in bars ten feet long. This remarkably accurate control is accomplished through means of a flexible drive band in driving engagement with the work supporting means supporting the lead bar and in which the band is responsive solely to table reciprocation for effecting rotation of the work supporting means.

It is an object of the present invention to provide a machine tool comprising a base, a reciprocal table on the base, rotary work supporting means on the table having its axis of rotation parallel to the direction of reciprocation of said table, means for effecting rectilinear reciprocation of the table, and a flexible drive band having its ends fixed to said base and having an intermediate portion in driving engagement with the work supporting means and responsive solely to table reciprocation for effecting rotation of the work supporting means.

It is another object of the present invention to provide a machine tool of the aforementioned type which has a disc on the rotary work supporting means and in which the flexible drive band has an intermediate portion in friction drive engagement with the disc throughout more than 180 degrees, said drive band being responsive solely to table reciprocation for effecting rotation of the work supporting means through the rotation of the disc.

Still another object of the present invention is to provide a machine tool of the aforementioned type in which the flexible drive band includes an elongated flexible metal tape having a razor thin thickness, the ends of said tape being fixedly secured to brackets mounted on opposite sides of the base and at the ends thereof.

A further object of the present invention is to provide a machine for grinding leads on relatively long lead bars in which the work supporting means carrying the lead bar is driven solely through means of a flexible drive band which is anchored on its ends to the base and which is responsive solely to table reciprocation for effecting rotation of the work supporting means and the lead bar relative to the grinding wheel.

A still further object of the present invention is to provide a machine tool of the aforementioned type which is simple in construction, economical to manufacture and provides accurate means for controlling the lead on the workpiece.

Other objects and features of the invention will become apparent as the description proceeds, especially when taken in conjunction with the accompanying drawing, illustrating a preferred embodiment of the invention, wherein:

FIGURE 1 is a perspective view of the machine tool.

FIGURE 2 is an end view of the machine looking at the machine from the left end thereof.

FIGURE 3 is a partial front elevation showing the means for reciprocating the table.

Referring now to the figures, the grinding machine or machine tool comprises a base or frame 10 on which is mounted a tool supporting head 12. The tool supporting head 12 may be mounted in various manners including the mounting thereof in ways which provide for angular or linear adjustment of the tool support 12. The tool support comprises a spindle to which a grinding wheel 14 is secured. A wheel housing 15 is provided for the wheel 14. Suitable means are provided for rotating the grinding wheel 14 in a well known manner.

Mounted on the base 10 is a table 16 which includes thereon a laterally extending support 18. Mounted on the table 16 is a head stock 20 and a tail stock 22. A relatively long workpiece or lead bar W, which may be approximately ten feet in length, is mounted between the stocks 20 and 22 and is supported against sagging at intermediate portions therebetween through means of a plurality of adjustable steady rests 24. The rests 24 are used to prevent or reduce deflection of long workpieces. Each rest 24 has three circumferentially spaced radially movable screws 26 which are received in the circumferential grooves provided on the workpiece W. Alternatively, a pair of rollers may be used as steady rests, as is well understood in the art.

Means are provided for reciprocating the table 16 and, as illustrated in FIGURE 3, may take the form of a cylinder 28 in which a piston 30 is provided with a connecting rod secured to a depending lug 34 at one end of the table 16.

Mounted on the rotatable center of the head stock 20 is a disc or cylinder 40. Means 42 dependent on reciprocation of the table are provided to drive the disc 40 and thereby effect rotation of the workpiece W. Means 42 include a flexible drive band or driving tape 44 made of steel or other suitable material which is engaged with the cylinder 40, preferably throughout substantially more than half of its periphery. The opposite ends 46 and 48 of the tape 44 are fixedly secured to brackets 50 and 52 respectively which are mounted at the ends of the base 10 on opposite sides thereof. The tape is maintained under substantial tension in use.

The laterally extending support 18 which is included as part of the movable table 16 has a plurality of guide rollers 54, 56, 58, 60, 62 and 64 mounted thereon. The tape 44 leads around the aforesaid rollers. The rollers 58 and 60 are mounted on the support 18 on opposite sides of and at the lower portion of the cylinder 40 with their axes parallel to the horizontal axis of the cylinder 40. The guide rollers 54, 56, 62 and 64 are mounted on the support 18 for rotation about vertical axes. The rollers 58 and 60 maintain the tape 44 in contact with the periphery of the disc 40 throughout more than 180 degrees.

With the foregoing described construction, the grinding wheel 14 is employed to grind a helical lead on the workpiece W. Initiation of traverse of the table 16 to the right is effective to rotate the disc or cylinder 40 in a counterclockwise direction as viewed from the left end of FIGURE 1. This is accomplished as a result of the intermediate portions of the tape 44 traversing the disc 40 and frictionally driving the disc in rotation. In other words, the distance between the bracket 50 and roller 54 increases while the distance between roller 64 and bracket 52 decreases. Rotation of the cylinder 40 in turn produces rotation of the workpiece W. The rotation of the cylinder 40 and workpiece W is accomplished in controlled timed relation with the reciprocation of the table 16.

Upon reversal of traverse, the drive tape 44 rotates the disc 40 in the opposite direction to effect rotation of the workpiece W in timed relation with the reciprocation of the table 16.

Such a construction has proven successful in machining leads on lead bars which are ten feet long and wherein the leads are accurately controlled within half a thousandth. As an example, a relatively long steel tape having cross-sectional dimensions of .015 inch and .5 inch has proven successful. In the present instance, the drive tape 44 extends around the guide rollers and the disc 40 and has the opposite ends thereof extending in opposite directions, as shown in FIGURE 1, and is secured in brackets mounted at the ends of the base and on opposite sides thereof.

Although the specification and drawing illustrate only one hand of lead, it should be understood that the plurality of rollers and tape may be arranged on the machine in relation to the disc 40 so as to produce a lead for the opposite hand.

The drawing and the foregoing specification constitute a description of the improved lead control structure in such full, clear, concise and exact terms as to enable any person skilled in the art to practice the invention, the scope of which is indicated by the appended claims.

What we claim as our invention is:

1. A machine tool comprising a stationary member, a movable member mounted for rectilinear movement on said stationary member, a tool support on one of said members, rotary work support means on the other of said members for supporting an elongated work piece, said work support means having its axis of rotation parallel to the direction of reciprocation of said movable member, a drive cylinder fixed to said rotary work support means, means for effecting rectilinear reciprocation of said movable member, mounting brackets on opposite sides of said one member at opposite ends thereof, a pair of first guide rollers mounted on said other member adjacent the edge of said drive cylinder, said first guide rollers having their axes parallel to the axis of said drive cylinder, a pair of second guide rollers mounted on said other member located laterally outwardly from said first guide rollers, said second guide rollers having their axes perpendicular to the axis of said drive cylinder, and a flexible elongated flat tension drive tape having its ends fixed to said mounting brackets, said flat drive tape extending substantially parallel to the direction in which said movable member moves, said flexible tape intermediate its ends being wrapped around both pairs of guide rollers and the periphery of said drive cylinder so that said cylinder and work support means will be turned by said drive tape upon reciprocation of said movable member, the portions of said flat drive tape intermediate the adjacent ones of the first and second guide rollers being twisted 90° with respect to the end portions of the tape.

2. A machine tool comprising a base, a reciprocable table on said base, rotary work supporting means on said table for supporting an elongated work piece, said work supporting means having its axis of rotation parallel to the direction of reciprocation of said table, a drive disc on said rotary work supporting means, means for effecting rectilinear reciprocation of said table, mounting brackets on opposite sides of said base at opposite ends thereof, a pair of first guide rollers mounted on said table adjacent the edge of said disc, said first guide rollers having their axes parallel to the axis of said disc, a pair of second guide rollers mounted on said table located laterally outwardly from said first guide rollers, said second guide rollers having their axes perpendicular to the axis of said disc, and a flexible elongated flat tension drive tape having its ends fixed to said mounting brackets, said flat drive tape extending substantially parallel to the direction in which said table moves, said flexible tape intermediate its ends being wrapped around both pairs of guide rollers and the periphery of said disc so that said disc and work supporting means will be rotated by said drive tape upon reciprocation of said table, the portions of said flat drive tape intermediate the adjacent ones of the first and second guide rollers being twisted 90° with respect to the end portions of the tape.

3. A machine tool comprising a base, a reciprocable table on said base, rotary work supporting means on said table for supporting an elongated work piece, said work supporting means having its axis of rotation parallel to the direction of reciprocation of said table, a relatively large drive disc on said rotary work supporting means, means for effecting rectilinear reciprocation of said table, mounting brackets on opposite sides of said base at opposite ends thereof, a pair of first guide rollers mounted on said table closely adjacent the edge of said disc at one side of the axis thereof, said first guide rollers having their axes parallel to the axis of said disc, a pair of second guide rollers mounted on said table located laterally outwardly from said first guide rollers, said second guide rollers having their axes perpendicular to the axis of said disc, and a flexible elongated flat tension drive tape having its ends fixed to said mounting brackets, said flat drive tape extending substantially parallel to the direction in which said table moves, said flexible tape intermediate its ends being wrapped around both pairs of guide rollers and the periphery of said drive disc for more than 180° so that said disc and work supporting means will be rotated by said drive tape upon reciprocation of said table, the portions of said flat drive tape intermediate the adjacent ones of the first and second guide rollers being twisted 90° with respect to the end portions of the tape.

References Cited in the file of this patent

UNITED STATES PATENTS

| | | |
|---|---|---|
| 1,065,869 | Hanson | June 24, 1913 |
| 1,135,780 | Drummond et al. | Apr. 13, 1915 |
| 1,249,332 | Cline | Dec. 11, 1917 |
| 1,870,764 | Aeppli | Aug. 9, 1932 |
| 2,376,110 | Aeppli | May 15, 1945 |

FOREIGN PATENTS

| | | |
|---|---|---|
| 163,665 | Great Britain | Aug. 11, 1922 |
| 728,988 | Germany | Feb. 3, 1943 |